US011183874B1

(12) United States Patent
Finkelstein

(10) Patent No.: US 11,183,874 B1
(45) Date of Patent: Nov. 23, 2021

(54) POWER GRID MONITORING USING NETWORK DEVICES IN A CABLE NETWORK

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

(*) Notice: Subject to any disclaimer, the term of this patent is extended or adjusted under 35 U.S.C. 154(b) by 0 days.

(21) Appl. No.: 16/880,870

(22) Filed: May 21, 2020

(51) Int. Cl.
*H02J 13/00* (2006.01)
*G06Q 50/06* (2012.01)

(52) U.S. Cl.
CPC ........ *H02J 13/00002* (2020.01); *G06Q 50/06* (2013.01); *H02J 13/00001* (2020.01); *H02J 13/00034* (2020.01)

(58) Field of Classification Search
None
See application file for complete search history.

(56) References Cited

U.S. PATENT DOCUMENTS

| 2009/0265042 | A1* | 10/2009 | Mollenkopf | H02J 3/1878 700/298 |
| 2011/0251807 | A1* | 10/2011 | Rada | G01D 4/00 702/61 |
| 2013/0346768 | A1* | 12/2013 | Forbes, Jr. | G05F 1/66 713/310 |
| 2017/0310112 | A1* | 10/2017 | Goasguen | H02J 3/32 |
| 2020/0136431 | A1* | 4/2020 | Huberman | H04L 41/145 |

* cited by examiner

*Primary Examiner* — Tan T. Nguyen
(74) *Attorney, Agent, or Firm* — Eversheds Sutherland (US) LLP

(57) ABSTRACT

Technologies are provided for the monitoring of a power grid using power measurements using cable network devices. An embodiment of the technologies includes a computing system that can cause the cable network devices to perform power measurements. The cable network devices include customer premises equipment. The computing system also can receive first data defining observed values corresponding to the power measurements. A first observed value of the observed values results from a first power measurement of the power measurements. The computing system also can obtain second data defining times corresponding to the power measurements, where the first power measurement occurs at a first time of the defined times. The computing system can then generate status data by analyzing the observed values, where the status data represent respective power utilization states of the cable network devices. The computing system can provide the status data to a remotely located computing device.

22 Claims, 9 Drawing Sheets

POWER GRID MONITORING USING NETWORK DEVICES IN A CABLE NETWORK

BACKGROUND

A power grid includes several types of equipment that can be monitored, such as power stations and aerial transformers. The power grid also includes power meters deployed at dwellings and other types of customer premises to measure power consumption. Power stations and transformers can be nearly uniformly distributed at respective spatial scales within the power grid. Those spatial scales can be substantially greater than the typical spacing amongst power meters in the power grid.

While operation of the power stations and transformers may be monitored, power meters simply serve to convey usage of power at a particular location. As a result, the spatial resolution of data identifying operation state of power stations and transformers may be limited to spatial resolutions that are about an order of magnitude greater than the spatial scale at which power meters are deployed within the power grid. Further, such data reveal operation states arising from operation at a source of power, not a point of utilization of power. Accordingly, the data may fail to reveal anomalous operations states that are detrimental to the operation of the power grid, but do not preclude the supply of power within the power grid.

Therefore, improved technologies that remedy those challenges may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

Figure 1:
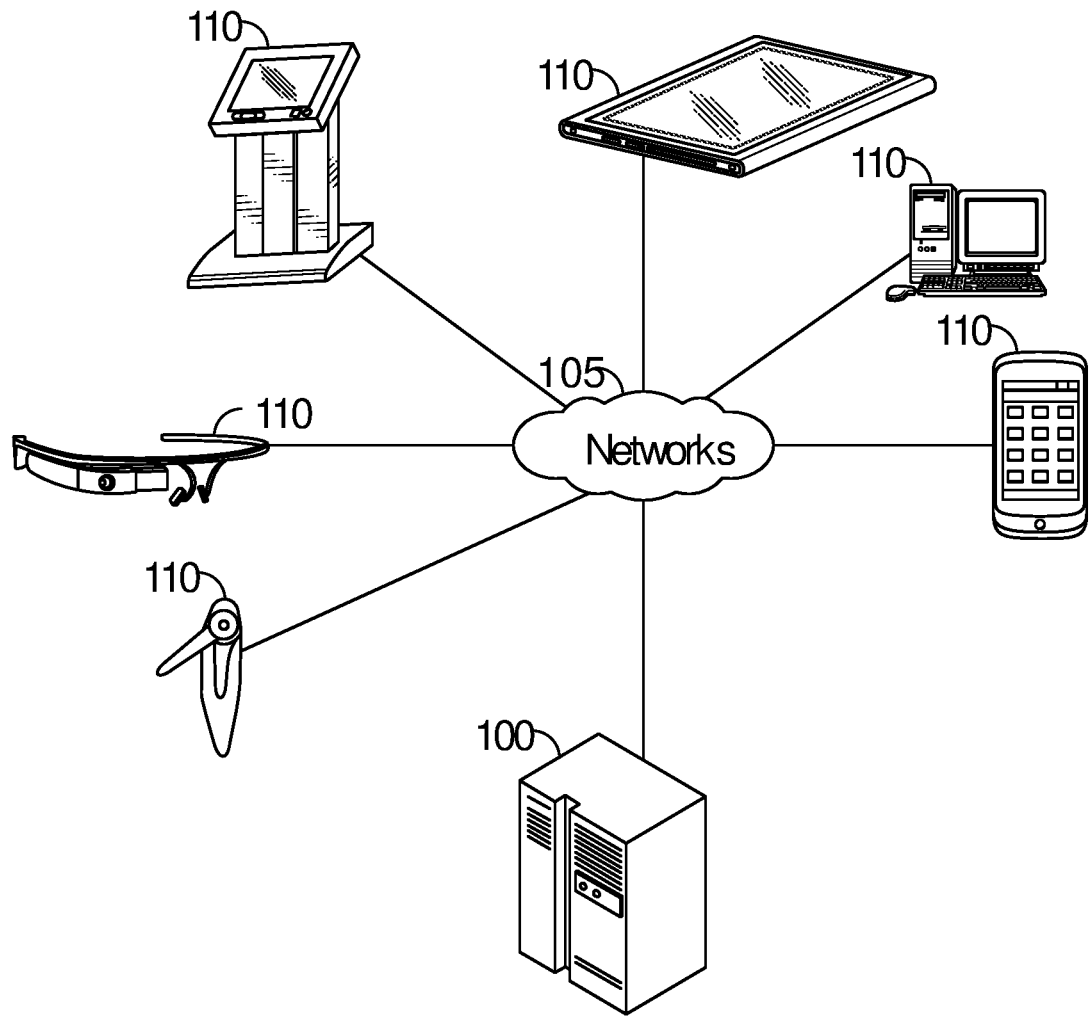
FIG. 1 presents an example of an operational environment in accordance with one or more embodiments of this disclosure.

Embodiments of the technologies disclosed herein are directed to monitoring of a power grid by means of network devices deployed in a cable network. Those network devices can be referred to as cable network devices and can include, for example, customer premises equipment (CPE), outside plant amplifiers, power inserter devices, remote PHY devices (RPDs), remote MAC devices (RMDs, optical nodes, a combination thereof, or similar. Not only are the cable network devices coupled to a power grid, but they also are distributed across different spatial scales within the cable network. Thus, embodiments of the disclosed technologies, individually or in combination, can monitor the power grid at different levels of spatial resolution by relying on power measurements performed by the cable network devices.

Embodiments of the technologies disclosed herein include a computing system that can cause the cable network devices to perform power measurements. The computing system also can receive first data defining observed values corresponding to the power measurements. A first observed value of the observed values results from a first power measurement of the power measurements. The computing system also can obtain second data defining times corresponding to the power measurements, where the first power measurement occurs at a first time of the defined times. The computing system can then generate status data by analyzing the observed values. The status data can represent respective power utilization states of the multiple devices. The computing system can provide the status data to a computing device remotely located relative to the computing system. In some configurations, the computing device can be deployed in a network operations center for the power grid.

In some configurations, prior to providing the status data, the computing system can detect an anomaly, or several anomalies, within the status data. In response, the computing system can execute an exception handling process. The computing system can then provide the status data or other status data based on the execution of the exception handling process.

Particular embodiments of the technologies disclosed herein can be implemented so as to realize at least one or several of the following advantages. In one example advantage, by providing status data, regardless of the manner in which the status data is provided, embodiments of the disclosed technologies can reveal power consumption states that are hidden to a network management platform of a power grid supplying power to a cable network. Not only can those embodiments render visible such hidden consumption states, but those embodiments also can provide various degrees of visibility, at different spatial resolutions—e.g., at the dwelling level, at the street level, at the neighborhood level, or similar.

In another example advantage, by detecting anomalies in status data and implementing an exception handling process in response to the anomalies, embodiments of the disclosed technologies can proactively notify a power supplier of a potentially impending operational failure, or another type of potential issue, in a particular region of a power grid administered by the power supplier. The power supplier can be, for example, an electricity company or a cooperative of electricity companies. Commonplace cable networks are typically unable to provide that type of notification. Further, those embodiments can provide notifications of potential operational issues with a spatial resolution that may be unavailable to the power supplier.

Other embodiments of this disclosure include corresponding systems, apparatuses, and computer programs, configured to perform the actions of the methods disclosed herein, where the methods can be encoded on computer storage devices.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow directional data flow capabilities. The terms "path," "pathway," and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Bluray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the li~e. Further, a non-volatile computer-readable storage medium may also include conductive-bridging random access memory (CBRAM), phase-change random access memory (PRAM), ferroelectric random access memory (FeRAM), non-volatile random-access memory (NVRAM), magnetoresistive random-access memory (MRAM), resistive random-access memory (RRAM), Silicon Oxide Nitride-Oxide-Silicon memory (SO OS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor/Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

Various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As is shown in FIG. 1, this particular embodiment may include one or more management computing entities 100, one or more networks 105, and one or more user devices 110. Each one of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices or portions of devices on a cable network, including cable modems, optical nodes, to s, active taps, switches, medium access control (MAC) devices, physical layer (PHY) devices, amplifiers, fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more modulation techniques, transmit signals including packets, receive including packets, process including packets, schedule including packets, etc.). Moreover, such management computing entities 100 may perform aspects of the transmission of data over networks in accordance with various techniques as described herein.

In another embodiment, the network(s) 105 may include cable networks, including hybrid fiber-coaxial networks. More broadly, the network(s) 105 may include at least portions of wireless networks or wired networks. In another embodiment, a cable network may use various sub-networks (e.g., Wi-Fi networks, cellular networks) to perform aspects of the functionality described herein, for example, in connection with the disclosed devices (e.g., switches, routers, cable network taps, MAC devices, cable modem termination system (CMTS) devices, PHY devices, amplifiers, optical fiber nodes, access points, and the like). In another embodiment, the networks 105 may use at least a portion of a fifth-generation cellular mobile communications, also referred to as 5G herein.

In another embodiment, the user devices 110 can include devices associated with a customer premises equipment (e.g., devices located in a dwelling of a user or on the person of a user). Non-limiting examples may include one or more computers, computing entities, desktop computers, mobile phones, tablets, phablets, notebooks, laptops, distributed systems, gaming consoles (for example Xbox, Play Station, Wii), watches, glasses, goggles, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Figure 2:
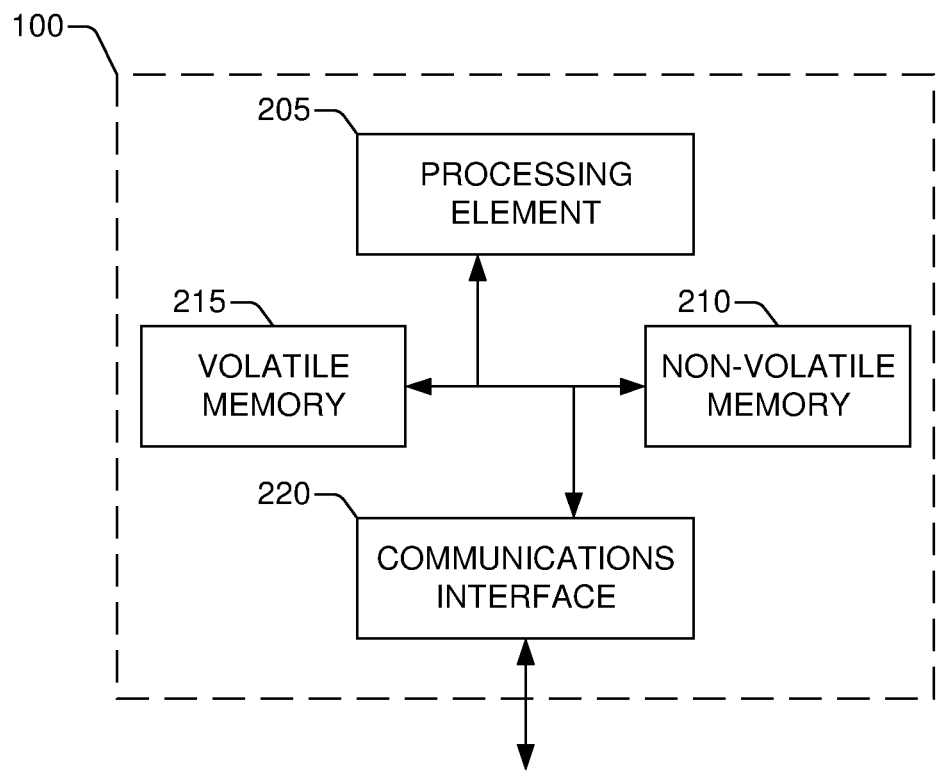
FIG. 2 presents an example of a management computing unit, in accordance with one or more embodiments of this disclosure.

FIG. 2 provides a schematic of a management computing entity 100 according to one embodiment of the present disclosure. As noted above, a management computing entity 100 may include various devices on a cable network, including switches, MAC devices, access point devices, taps, active taps, PHY devices, amplifiers, fiber nodes, and the like.

Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing component may serve to determine various parameters associated with the signal for transmission over the network. For example, the processing component may serve to determine various parameters for the signal a modulation scheme, a power level (a particular power level and/or code scheme), a frequency band of communication, header information associated with the signal, combinations thereof, and/or the like.

In one embodiment, the transmitting component (not shown) may serve to transmit the signal from one device to another device on the network. For example, the transmitting component may serve to prepare a transmitter (e.g., transmitter 304 (FIG. 3)) to transmit the signal over the network. For example, the transmitting component may queue the signal in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top.boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As is shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controller devices. Further, the processing element 205 may be embodied as one or more other processing devices or circuitry. The term circuitry may refer to an entirely hardware embodiment or a combination of hardware and computer program products. Thus, the processing element 205 maybe embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or nonvolatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, DOCSIS®, or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA20001× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

In some configurations, one or more component of the management computing entity 100 may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some embodiments, user devices 110 may include, but not be limited to, devices associated with a customer premise equipment, as described above. In another embodiment, the user device 110 may be configured to receive data from an access point, or other similar device (e.g., at a customer premise equipment site such as a home).

In various aspects, the processing component, the transmitting component, and/or the receiving component (not shown) may be configured to operate on one or more devices and may include aspects of the functionality of the management computing entity 100, as shown and described in connection with FIG. 1 and FIG. 2. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

Figure 3:
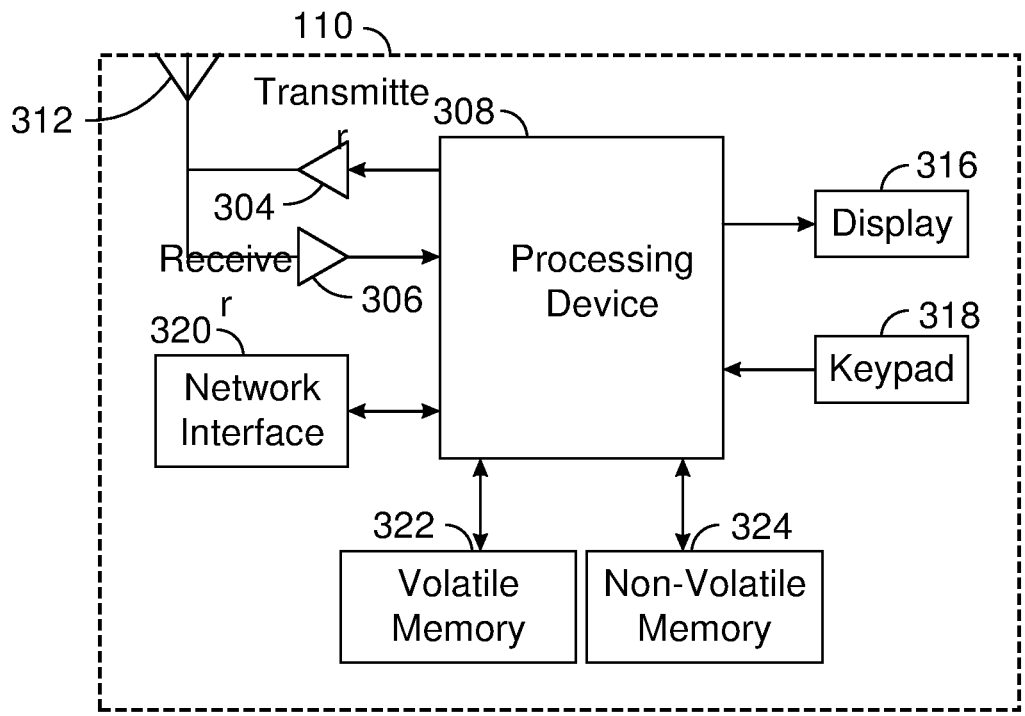
FIG. 3 presents an example of a user device, in accordance with one or more embodiments of this disclosure.

FIG. 3 is a schematic block diagram of a representative user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words use herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's I 10 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate some functions, such as screen savers and/or sleep modes.

The user device 110 can also include volatile storage or memory 322 and/or nonvolatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, .SO OS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, YR.AM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

Figure 4:
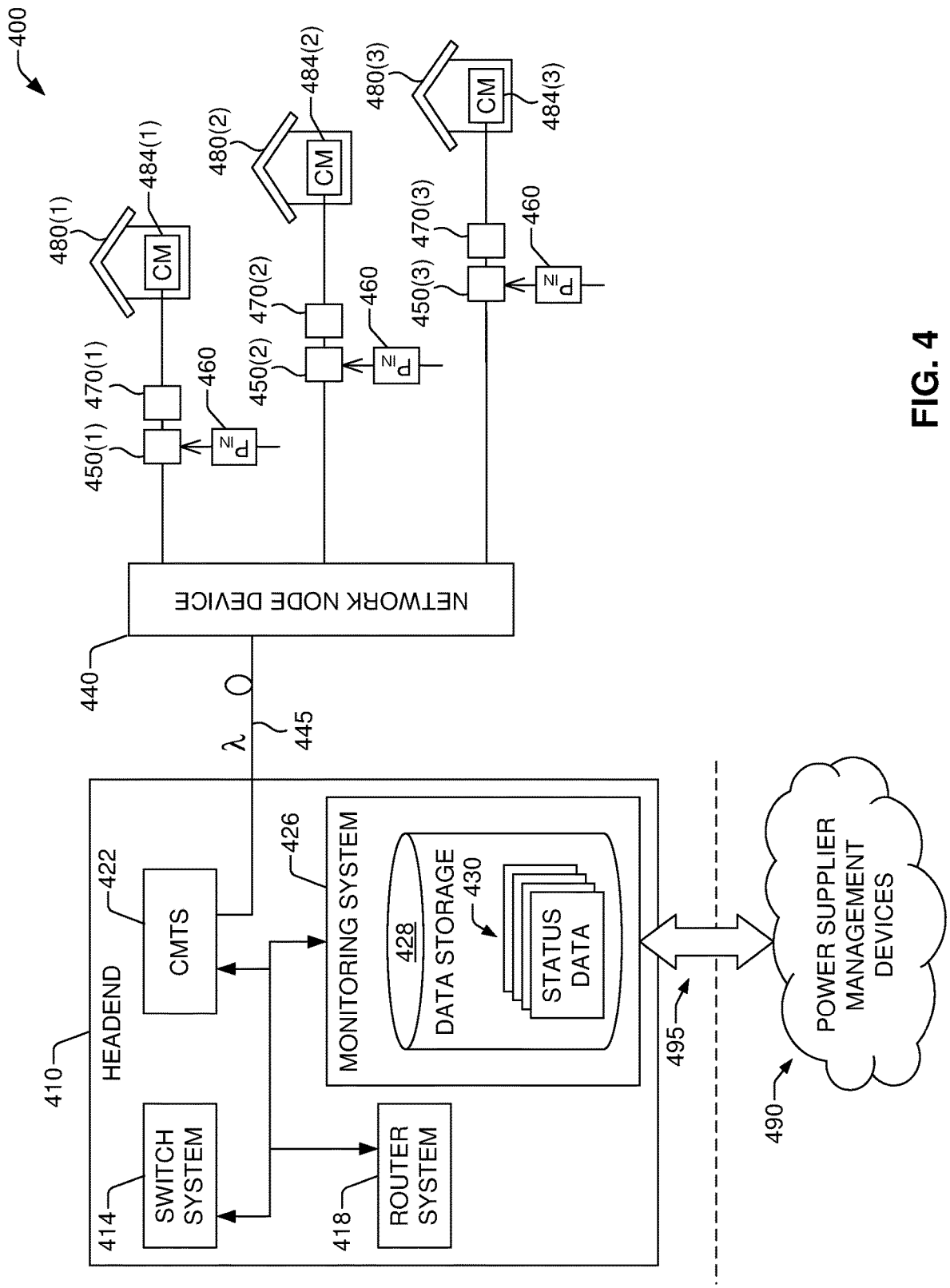
FIG. 4 presents an example of a section of a cable network for power grid monitoring using network devices in a cable network, in accordance with one or more embodiments of this disclosure.

FIG. 4 is a schematic block diagram of an example of an operational environment 400 for monitoring of a power grid using network devices in a cable network, in accordance with one or more embodiments of this disclosure. The operational environment 400 includes a section of the cable network. Such a section includes a cable system headend 410. The cable system headend 410 includes a system switch 414, a router system 418, and a CMTS 422. The cable system headend 410 can receive television signals and other data by means of a fiber optic backbone or a wireless connection to a satellite system. As is illustrated in FIG. 4, the CMTS 422 is functionally coupled to a node device 440 by means of a distribution architecture 445. The distribution architecture 445 can include, in some embodiments, a distribution hub (or hubsite) and a fiber optic backbone ending at the network node device 440. The distribution hub can correspond to a particular coverage region (such as a residential neighborhood, an industrial zone, or similar). The network node device 440 can serve about 25 to about 500 dwelling within that particular coverage region, for example. In some embodiments, the network node device 440 can have a converged cable access platform (CCAP) functionality. In other embodiments, the network device 420 can serve as a remote physical (PHY) device, that is, a device having PHY layer functionality as is described in connection with the open systems interconnection (OSI) model. In addition, or in yet other embodiments, the network node device 440 can serve as a remote MAC device (RMD).

The network device 440 can be functionally to coaxial lines and various downstream network devices. In some embodiments, the coaxial lines can be assembled in a trunk-and-branch configuration. The downstream network devices can include amplifiers. In one configuration, each one of the amplifiers can be a bidirectional RF amplifier that can amplify upstream RF signals and downstream RF signals. In an embodiment in which coaxial lines are assembled in a trunk-and-branch configuration, those amplifiers can include trunk amplifiers and one or multiple line amplifiers. Thus, as is illustrated in FIG. 4, the node device 440 can be functionally coupled to an amplifier 470(1), an amplifier 470(2) and an amplifier 470(3).

The amplifiers are active devices and can be energized by means of respective power inserter devices. Each one of the respective power inserter devices can be functionally connected to both an amplifier and a power grid (note depicted in FIG. 4), receiving input power from the power grid. The input power energizes the amplifier. As such, the amplifier 470(1), the amplifier 470(2), and the amplifier 470(3) can be energized by means of a power inserter device 450(1), a power inserter device 450(2), and a power inserter device 450(3), respectively. As is illustrated in FIG. 4, each of the power inserter device 450(1), the power inserter device 450(2), and the power inserter device 450(3) can receive input power PIN 460.

The downstream network devices also can include customer premises equipment (CPE) deployed at dwellings within the coverage area served by the network device 440. The CPE can include cable modems (CMs), wireless routers, wireless gateways (e.g., Wi-Fi gateways), set-top boxes, and the like. The CPE at a dwelling can be coupled to an amplifier (e.g., a line RF amplifier) by means of a drop coaxial line, a tap device, and distribution coaxial line, for example. The drop coaxial line extends from the dwelling to the tap device, and the distribution coaxial line extends from the tap device to the amplifier. Simply as an illustration, for the sake of simplicity of explanation, a first dwelling 480(1) includes a CM 484(1), a second dwelling 480(2) includes a CM 484(2), and a third dwelling 480(3) includes a CM 484(3). Although a CM is depicted, other CPE can be deployed at each of the first dwelling 480(1), the second dwelling 480(2) and the third dwelling 480(3).

While not depicted in FIG. 4, other network node devices and downstream network devices can be present in the cable network that includes the network node device 440 and associated downstream network devices. The network node devices and downstream network devices are cable network devices and can be deployed across different spatial scales. A first subgroup of the network devices can be distributed according to a first spatial scale. A second subgroup of the multiple network devices can be distributed according to a second spatial scale less than the first spatial scale. A third group of the multiple network devices can be distributed according to a third spatial scale less than the second scale. Simply as an illustration, in some embodiments, the first subgroup of network devices can include network node devices or trunk RF amplifiers. Thus, the first spatial scale can be of the order of kilometers. The first network node devices can include remote PHY devices (RPDs), remote MAC devices (RMDs, optical nodes, or a combination thereof. In addition, or in other embodiments, the second subgroup of network devices can include line RF amplifiers and, thus, the second spatial scale can be of the order of hundreds of meters. Further, or in yet other embodiments, the third group of the multiple network devices can include CPE and, thus, the third spatial scale can be of the order of tens of meters.

At least some of the cable network devices disclosed herein can perform power measurements. Because the cable network devices can be deployed at different locations across different spatial scales, those power measurements can provide information representing operational statuses of a power grid at different locations and different spatial resolutions. The power measurements can include, for example, measurements of input voltage, measurements of output voltage, measurements of input current, measurements of output current, measurements of input power, measurements of output power, and similar.

Each of a voltage and a current being measured can be either DC or AC. Measurements of a DC voltage and an AC voltage can include, respectively, a measurement of an amplitude of the DC voltage and a measurement of an amplitude of the AC voltage. A measurement of the AC voltage also can include a measurement of a phase angle of the AC voltage. Similar measurements can be performed for a current. Specifically, measurements of a DC current and an AC current can include, respectively, a measurement of an amplitude of the AC current and a measurement of an amplitude of the AC current. In addition, a measurement of the AC current also can include a measurement of a phase angle of the AC current.

The cable system headend 410 includes a monitoring system 426 that can leverage the cable network devices to generate data representative of power consumption status of the power grid. To that end, the monitoring system 426 can cause multiple cable network devices to perform power measurements. Thus, in some configurations, the monitoring system 426 can direct the multiple cable network devices to perform the power measurements at defined times, e.g., periodically, with a defined period T, or according to a defined schedule. As an example, the defined period T can be one of 60 seconds, one minute, two minutes, three minutes, four minutes, five minutes, 15 minutes, one hour, 12 hours, or 24 hours. Other magnitudes of T can be implemented. In some instances, the multiple cable network devices can be directed individually or collectively to perform the power measurements. When each one of the multiple devices is directed individually, the defined times can be specific to the cable network device directed to perform the power measurements.

In addition, or in other configurations, the monitoring system 426 can direct the multiple cable network devices to perform the power measurements in nearly real-time. In those configurations, the power measurements can be performed nearly continuously, as the device operates. A time interval between successive power measurements when performed in nearly real-time can be dictated by processing conditions (processing load, for example) and/or other response times involved in the performance of power measurements. Time intervals between different pairs of successive measurements can be different.

Further, or in yet other configurations, the monitoring system 426 can direct the multiple cable network devices to perform the power measurements in response to a defined event. The defined event can be, in some instances, specific to the cable network device being directed to perform the power measurements. An example of the defined event includes transition from an offline state to an online state. Other examples include processing load becoming less than a threshold value, and traffic level exceeding a defined threshold level. Other types of defined events can be contemplated.

Directing the multiple devices to perform power measurements can include sending respective instruction messages directing the multiple devices to perform defined power measurements at defined times. Thus, the computing system can send a first instruction message directing a first device of the multiple devices to perform first power measurements, and also can send a second instruction message directing a second device of the multiple devices to perform second power measurements. Each one of the respective instruction messages can be formatted according to a communication specification compliant with DOCSIS®. Each one of the respective instruction messages can include first payload data defining the times at which power measurement are to be performed; second payload data indicating that power measurements are to be performed in real-time, or third payload data defining an event that can cause a power measurement to be performed; or both such types of payload data. The instructions messages can be sent to respective cable network devices through the CMTS 422.

Further, or in yet other configurations, the monitoring system 426 can cause the multiple cable network devices by polling the multiple cable network devices for power data at defined times, e.g., periodically, with a defined period T, or according to a defined polling schedule. Polling a cable network device (e.g., CM 484(1) or amplifier 470(2)) for power data can include, for example, sending a request for the power data to the cable network device. The cable network device can then respond to the request by performing a power measurement upon receiving the request. In other situations, the cable network device can respond to the request by queueing the request and performing the power measurement at a suitable time after receiving the request. The suitable time can be a time at which the operational state of the cable network device permits allocating processing resources or communication resources, or both, the performance of a power measurement and the communication of a resulting observed value. The processing state can be a particular processing load condition, a network traffic level, available bandwidth, a combination thereof, or similar.

The monitoring system 426 can send the request for power data using a messaging protocol supported in a cable network. The request can be embodied in a message formatted according to the message protocol, and can include an instruction to perform a power measurement. Payload data carried in the message can define the instruction. As an illustration, the monitoring system 426 can use proactive network maintenance (PNM) messaging in accordance with data-over-cable service interface specifications (DOCSIS®). As such, the instruction to perform a power measurement can be sent as payload data carried in a message formatted according to PNM. DOCSIS® describes telecommunications specifications that permit or otherwise facilitate the addition of high-bandwidth data transfer to a cable network. In particular, DOCSIS® may enable the deployment of data-over-cable systems on a nonproprietary, multivendor, interoperable basis for bidirectional transfer of Internet Protocol (IP) traffic between a cable system headend and CPE over an all-coaxial network or an HFC network.

Figure 5A:
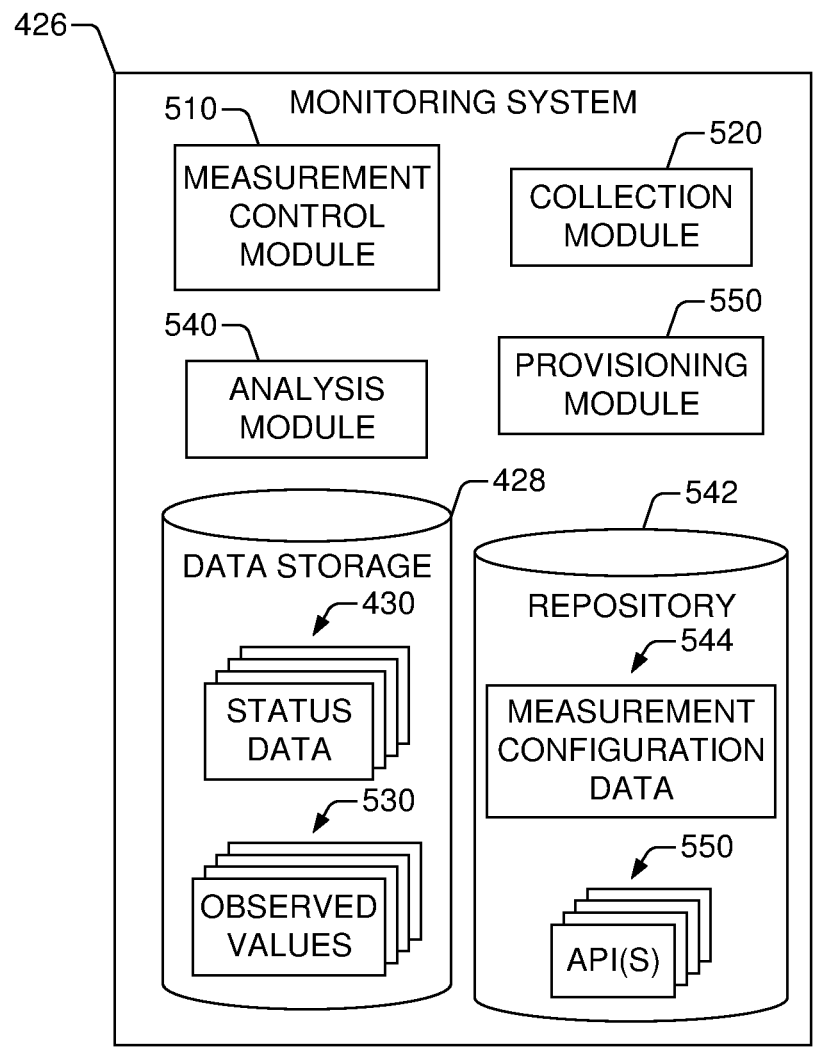
FIG. 5A presents an example of a system for power grid monitoring using network devices in a cable network, in accordance with one or more embodiments of this disclosure.

In some embodiments, as is illustrated in FIG. 5A, the monitoring system 426 can include a measurement control module 510 that can cause one or many cable network devices to perform power measurements, in accordance with aspects described herein. Accordingly, in some configurations, the measurement control module 510 can direct one or many cable network devices, individually or collectively, to perform a power measurement at defined times. In addition, or in other configurations, the measurement control module 510 can poll the one or many cable network devices, individually or in combination, for power data. In one of those embodiments, the monitoring system 426 can include data defining a manner of performing measurements. Such data can be retained in one or more memory elements 544 (referred to as measurement configuration data 544) within a repository 542. The measurement configuration data 544 can include and can include, for example, one or a combination of polling schedules or other types of defined times for the performance of power measurements; anomaly rules; threshold values; and the like. The measurement control module 510 can utilize the measurement configuration data 544 to select a particular power measurement protocol and cause one or many cable network devices to perform power measurements. Although not shown in FIG. 5A or FIG. 5B, the repository 542 can include one or more memory elements retaining one or many communication addresses of respective computing devices that can receive status data, messages, reports, and the like, from the monitoring system 426.

Besides directing a cable network device (e.g., a CPE, an amplifier, a power inserter, or similar) to perform a power measurement, in some embodiments, the monitoring system 426 also can direct the cable network device to send a shutdown notification. In one of those embodiments, upon being de-energized, the cable network device can send a notification indicating that the cable network device has transitioned to an offline state. The notification can be a single data packet formatted according to DOCSIS®, for example. Capacitors within the cable network device can store sufficient energy to permit transmission of the data notification upon the cable network transition to the offline state. The monitoring system 426 can use such a notification to identify the cable network device as being de-energized.

The monitoring system 426 can receive data defining observed values corresponding to the power measurements. In some configurations, each observed value corresponds to a respective power measurement of the power measurements. The data can be received through the CMTS 422, using PNM messaging in accordance with DOCSIS®, for example.

As such, data defining an observed value corresponding to a power measurement can be received as payload data carried in a message formatted according to PNM. The amount of payload data carried in the message can be of the order of one byte. Simply as an illustration, such an amount can be one byte, two bytes, three bytes, or four bytes. In some embodiments, as is shown in FIG. 5A, the monitoring system 426 can include a collection module 520 that can receive such data using, for example, PNM messaging in accordance with DOCSIS®. The collection module 520 can retain the observed values defined by the received data in one or more memory elements 530 (referred to as observed values 530) within the data storage 428.

In addition, the monitoring system 426 can obtain data defining times corresponding to the power measurements. In some configurations, each defined time represents an instant when a respective power measurement occurred. In some embodiments, obtaining the data includes receiving the data from a network device that performs the power measurement. Such data can be received using PNM messaging in accordance with DOCSIS®. Thus, data defining a time corresponding to a power measurement can be received as payload data carried in a message formatted according to PNM. Again, the amount of payload data carried in such a message can be of the order of one byte. Simply as an illustration, such an amount can be one byte, two bytes, three bytes, or four bytes. In other embodiments, obtaining the data includes determining times at which data defining respective power measurements have been received by the computing system. Those determined times can essentially correspond to the actual times at which network devices performed respective power measurements. Differences between the determined times and the actual times can originate from network latency associated with receiving data defining observed values corresponding to power measurements.

In some instances, first data defining an observed value corresponding to a power measurement and second data defining a time corresponding to the power measurement can be received in a single message formatted according to PNM. In those instances, both the first data and the second data are carried as payload in the message.

The monitoring system 426 can generate status data by analyzing the observed values. The status data represent respective power utilization states of the multiple devices. The observed values can be analyzed in numerous ways. In one configuration, the monitoring system 426 can generate statistics of the observed values. In addition, or in another configuration, analyzing the observed values also can include generating functions of a time series formed by the observed values. Such functions can include a discrete n-th order derivative of the time series, e.g., a first derivative of the time series, a second derivative of the time series, and so forth. By generating one or several of those functions, the computing system can determine a trend of the time series. For example, the trend can include a monotonous decay in input power at a cable network, as a function of time. Such a trend can represent, in some situations, an illicit extraction of power from the power grid supplying power to the outside plant including the cable network device. In some embodiments, as is illustrated in FIG. 5A, the monitoring system 426 can include an analysis module 540 that can perform the analysis of the observed values.

Regardless of the particular manner of analyzing the observed values, the monitoring system 426 (via the analysis module 540 (FIG. 5), for example) can implement the analysis in one of two modalities: (1) Essentially real-time mode, in which mode the observed values are analyzed as the observed values become available to the monitoring system 426. (2) Batch mode, in which mode the observed values are analyzed after a defined amount of data is received or after a defined time interval for data collection has elapsed. The defined time interval can be one hour, six hours, 12 hours, or 24 hours, for example. Other defined time interval also can be implemented.

Back to FIG. 4, the monitoring system 426 can provide the status data to one or many network devices of a power supplier. As is illustrated in FIG. 4, the monitoring system 426 can provide the status data to at least one device of multiple power supplier management devices 490. Such management devices 490 can constitute a network operations center (NOC) for a power grid, in some embodiments. It is noted that the disclosed technologies are not limited in that respect and, in some embodiments, the monitoring system 426 can provide status data to other types of computing devices remotely located relative to the monitoring system 426.

The status data can be provided in numerous ways. For example, the monitoring system 426 can provide the status data by updating records 430 retained in the data storage 428, and then permitting access to the updated records. The records 430 within the data storage 428 can constitute a database, in some configurations. The database can be a relational database or another type of database containing unstructured data.

Updating the records can include adding metadata to the status data to generate location-based status data. The metadata can define a location corresponding to a subset of the power measurements, for example. The updating also can include using the location-based status data to generate updated records, each one of the updated records including a defined observed value corresponding to a defined power measurement of the subset of power measurements; the metadata; and a timestamp defining a time of performance of the defined power measurement. The monitoring system 426 can determine such a location, and other similar locations, by mapping a unique identifier of cable network device(s) that originated the subset of performance measurements to record(s) defining the location. The unique identifier can be a universally unique identifier (UUID), for example. Records defining respective locations and unique identifiers can be retained in the CMTS 422 (FIG. 4) for example.

To provide access to the updated records, in some embodiments, the monitoring system 426 can configure and expose an application programming interface (API). The API can be exposed as a public API or a private API. In some instances, configuring the API can include generating the API or enabling functionalities of the API, or both. Particular network device(s) within the power supplier management devices 490 can access the status data, stored in the records 430, by means of the private API. In other words, the particular network device(s) can perform one or many types of function calls defined by the API. The functionalities of the API that are available when the API is exposed as a public API can be different from other functionalities that are available when the API is exposed as a private API. Those second functionalities can be specific to the particular network device. In addition, or in other embodiments, the monitoring system 426 can generate a file that includes at least a subset of the updated records. In some embodiments, as is illustrated in FIG. 5A, the monitoring system 426 can include a provisioning module 550 that can provide the status data, in accordance with aspects described herein. The provisioning module 550 can configure and expose the API discussed above. The provisioning module 550 also can generate the file discussed above. Configured APIs can be retained in one or more memory elements 550 (referred to as API(s) 550) within the repository 540.

The monitoring system 426 can then send the file to at least one network device of the power supplier management devices 490. The file can be sent wirelessly and/or using wireline connection(s), by means of a communication architecture 495. To that point, for the purposes of illustration, the communication architecture 495 include components that permits the exchange of data and/or signaling between the monitoring system 426 and the at least one network device. Such an exchange can be a wireless exchange or a wireline exchange, or a combination of both. The wireless exchange can be implemented in accordance with one or more radio protocols, such as 3G, LTE, LTE-A, 5G, or similar. Accordingly, the communication architecture 495 can include communication links (wireless links and/or wireline links), base station(s), and/or multiple communication network devices. The communication network devices can include components of radio access network(s) (RAN(s)) and/or other types of devices, such as server devices, gateway devices, router devices, and the like.

By providing status data, regardless of the manner in which the status data is provided, the monitoring system 426 can reveal power utilization states that are hidden to a NOC of a power grid supplying power to a cable network including the monitoring system 426. Not only can the monitoring system 426 render visible such hidden utilization states, but it also can provide various degrees of visibility, at different spatial resolutions.

In some embodiments, prior to providing the status data generated by the monitoring system 426, the monitoring system 426 can determine if an anomaly is present in the status data. To that end, in some instances, the monitoring system 426 can determine if one or many observed values corresponding to a particular type of power measurement are, individually, greater than a first threshold value or less than a second threshold value. In an instance in which one of such observed values exceeds the threshold value, the monitoring system 426 can determine that the anomaly is present. The particular type of power measurement utilized to detect the anomaly can be, for example, voltage measurement or current measurement. In addition to being specific to the type of power measurement, the threshold value also can be specific to a type of cable network device (e.g., CPE, outside plant amplifier, power inserter device, RPD, optical node, or similar).

In addition, or in other instances, the monitoring system 426 can determine if temporal changes in a time series of at least some of the observed values satisfies an anomaly rule. Accordingly, in one configuration, the monitoring system 426 can determine a standard deviation of the observed values in the time series. The monitoring system 426 also can determine one or more other types of moments (mean value, skewness, etc.) of the observed values in the time series. By determining the standard deviation and/or the other moment(s), the monitoring system 426 can assess the temporal changes of the time series. The monitoring system 426 can then determine that the anomaly rule is satisfied in response to the standard deviation (and/or another moment) being equal to or greater than a defined threshold value. Stated in different terms, the monitoring system 426 can detect an anomaly in the time series of at least some of the observed values when the temporal spread of the observed values meets or exceeds a particular threshold magnitude.

Further, or in another configuration, the monitoring system 426 can determine a discrete first-order derivative of the time series of observed values. The monitoring system 426 can then determine that the anomaly rule is satisfied when values of the first-order derivative increase monotonically, and the magnitude of at least one of such values exceeds a defined threshold magnitude. In the alternative, the monitoring system 426 can then determine that the anomaly rule is satisfied when values of the first-order derivative decrease monotonically, and the magnitude of at least one of such values exceeds a defined threshold magnitude. Stated differently, the monitoring system 426 can detect an anomaly in the time series of observed values when the temporal changes exhibit a spike.

Figure 5B:
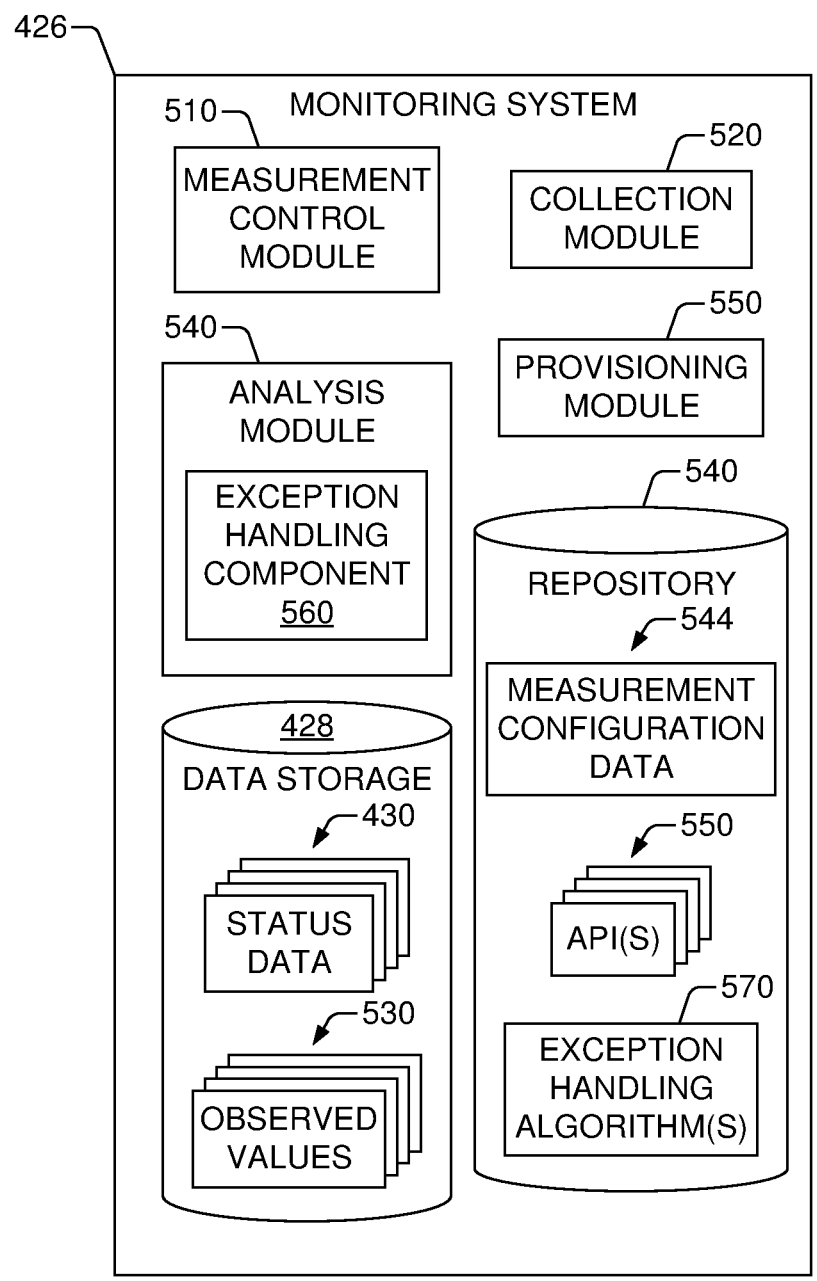
FIG. 5B presents another example of a system for power grid monitoring using network devices in a cable network, in accordance with one or more embodiments of this disclosure.

In response to determining that the anomaly is not present in the status data, the monitoring system 426 can provide the status data as is discussed above. In the alternative, in response to determining that the anomaly is present in the status data, the monitoring system 426 can execute an exception handling process based on the anomaly. To that end, in one configuration, as is illustrated in FIG. 5B, the analysis module 540 can include an exception handling component 560 that can perform the exception handling process. In addition, the exception handling process can be retained in one or more memory elements 570 (referred to as exception handling algorithm(s) 570) within the repository 540.

In some embodiments, the exception handling process can include identifying a particular cable network device of the multiple cable network devices, where the particular device has originated at least one observed value associated with the status data. The exception handling process also can include determining a location of the particular device. when executing the exception handling process, the monitoring system 426 can determine the location by mapping a unique identifier of the particular cable network device to a record defining the location. The unique identifier can be a UUID, for example. Records defining respective locations and unique identifiers can be retained in the CMTS 422 (FIG. 4) for example.

The exception handling process can further include generating a message including at least one of the location or data indicating the type of anomaly that is present in the status data. Such a message can serve as a warning of the presence of the anomaly in the status data, at a particular location. The provisioning module 550 (FIG. 5B) can generate such a message in some instances. In some configurations, the exception handling process also can include sending the message to at least one of the power supplier management devices 490. As part of execution of the exception handling process, the monitoring system 426 can send the message wirelessly or using a wireline connection, or both, by means of a communication architecture 495.

In addition, or in other embodiments, the exception handling process can include monitoring a group of cable network devices during a defined time interval after the anomaly is detected, where each cable network device in the group has originated observed values associated with the status data containing the anomaly. The exception handling process also can include identifying a subset of the cable network devices in the group, where each device in the subset has sent a shutdown notification during the defined time interval. The exception handling process can further include determining respective locations of devices included in the subset. When executing the exception handling process, the monitoring system 426 can determine the respective locations by mapping unique identifiers (e.g., UUIDs) of those devices to respective records defining the respective locations. As mentioned, records defining respective locations and unique identifiers can be retained in the CMTS 422 (FIG. 4) for example.

The exception handling process also can include generating a message including the respective locations and data indicating an offline state. The provisioning module 550 (FIG. 5B) can generate such a message in some instances. The exception handling process also can include, in some configurations, sending the message to at least one of the power supplier management devices 490. As part of execution of the exception handling, the monitoring system 426 can send the message wirelessly or using a wireline connection, or both, by means of a communication architecture 495.

In some embodiments, in addition to determining locations, the exception handling process can include determining times at which shutdown notifications have been received by the monitoring system 426. Those times can essentially correspond to the actual times at which the devices transition to an offline state. Differences between the determined times and the actual times can originate from network latency associated with receiving a shutdown notification from a able network device. In those embodiments, as a result of executing the exception handling process, the time dependence and position dependence of power shutdown can be tracked in a particular region of a cable network. Thus, the monitoring system 426 can track propagation of a power shutdown front (or profile) in time and space in essentially real-time across the region, as cable network devices transition to an offline state.

The exception handling process also can include generating one or many messages including respective locations of cable network devices that have transitioned to an offline state, time of occurrence of such a transition, and data indicating an offline state. Additional or alternative types of messages can be generated by leveraging the available temporal and spatial information. For instance, reports at respective defined times can be generated, each report including data marking the report as a shutdown status report; data identifying a defined time; and the respective locations. The provisioning module 550 (FIG. 5B) can generate the foregoing message(s) and/or the reports, in some instances. The exception handling process also can include, in some configurations, sending the message to at least one of the power supplier management devices 490. As part of execution of the exception handling, the monitoring system 426 can send the message wirelessly or using a wireline connection, or both, by means of a communication architecture 495.

The monitoring system 426 can provide second status data based on the execution of the exception handling process. The second status data can be provided in accordance with aspects described herein.

By detecting anomalies in status data and implementing an exception handling process in response to the anomalies, the monitoring system 426 can proactively notify a power supplier of a potentially impending operational failure, or another type of potential issue, in a particular region of a power grid administered by the power supplier. Conventional cable networks are typically unable to provide that type of notification. Further, the monitoring system 426 can provide notifications of potential operational issues with a spatial resolution that may be unavailable to the power supplier.

Figure 6:
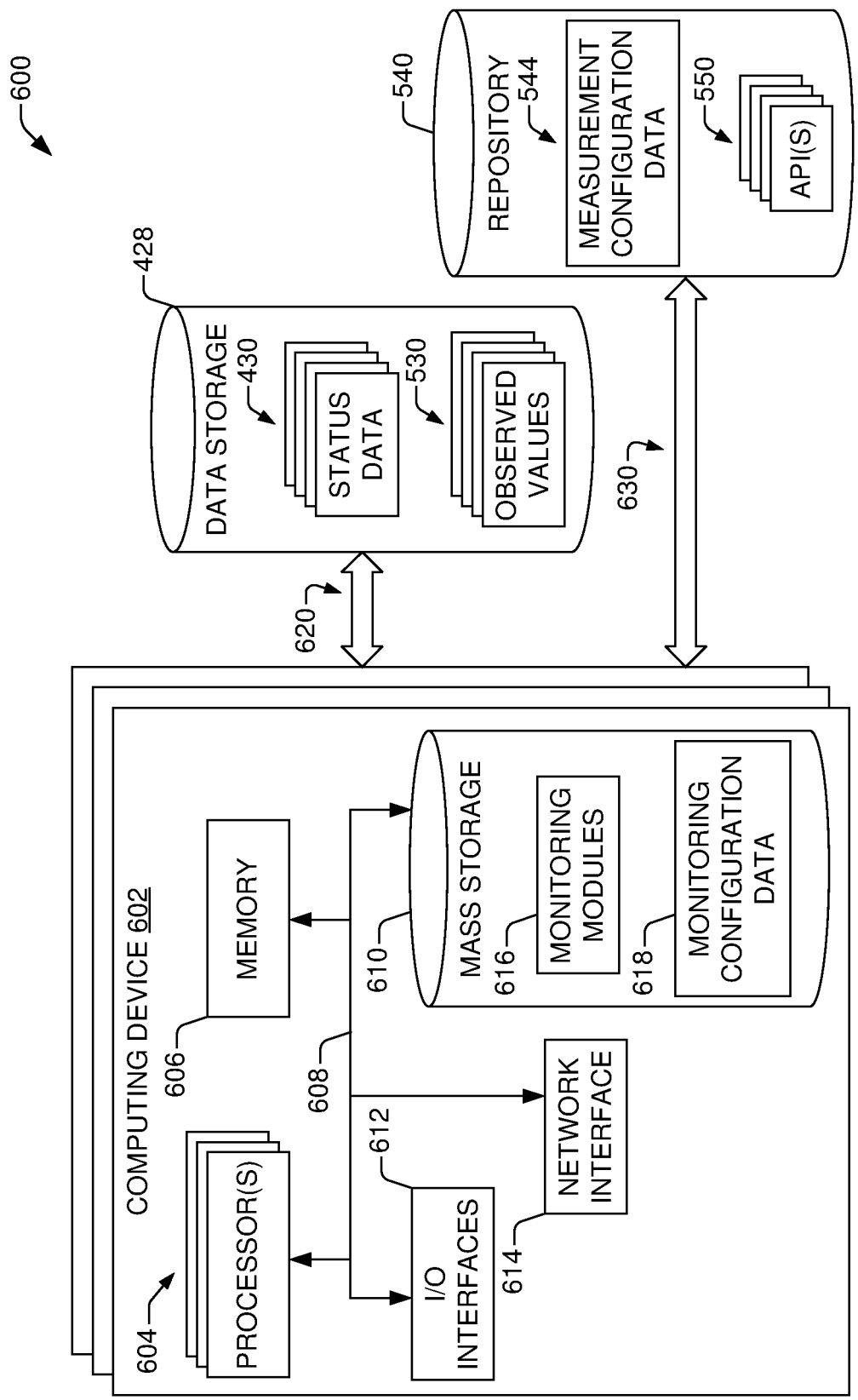
FIG. 6 presents an example of a computing system for power grid monitoring using network devices in a cable network, in accordance with one or more embodiments of this disclosure.

FIG. 6 is a schematic block diagram of an example of a computing system 600 for power grid monitoring using network devices in a cable network, in accordance with one or more embodiments of this disclosure. The computing system 600 can include one or many computing devices 602 that can be used in accordance with aspects of this disclosure. The computing device(s) 600 can embody, or can form a part of, the monitoring system 426. Each one of computing device(s) 600 includes at least one processor 604 that executes instructions that are stored in one or many memory devices (referred to as memory 606). The instructions can be, for instance, instructions for implementing functionality described as being performed by one or more modules and systems disclosed above or instructions for implementing one or many of the methods disclosed herein. The processor(s) 604 can be embodied in, for example, a CPU, multiple CPUs, a GPU, multiple GPUs, a multi-core processor, a combination thereof, or similar processing devices. In some embodiments, the processor(s) 604 can be arranged in a single computing device. In other embodiments, the processor(s) 604 can be distributed across two or more computing devices (e.g., multiple CPUs; multiple GPUs; a combination thereof; or the like).

The processor(s) 602 can access the memory 604 by means of a communication architecture 608 (e.g., a system bus). The communication architecture 608 is suitable for the particular arrangement (localized or distributed) and type of the processor(s) 604. In some embodiments, the communication architecture 608 can include one or many bus architectures, such as a memory bus or a memory controller; a peripheral bus; an accelerated graphics port; a processor or a local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), a combination thereof, or the like.

In addition to storing executable instructions, the memory 606 also can retain various types of data that can be used to provide the functionalities described herein for power monitoring of a power grid using cable network devices. As an example, such data can include polling schedules or other types of defined times for the performance of power measurements; anomaly rules; threshold values; communication address(es) or computing devices; a combination thereof; or similar.

Each computing device 600 additionally can include mass storage 610 that is accessible by the processor(s) 604 by means of the communication architecture 608. The mass storage 608 can include machine-accessible instructions (e.g., computer-readable instructions and/or computer-executable instructions). In some embodiments, the machine-accessible instructions are encoded in the mass storage 610 and can be arranged in components that can be built (e.g., linked and compiled) and retained in computer-executable form in the mass storage 610 or in one or more other machine-accessible non-transitory storage media included in the computing device 602, for example. Such components can embody, or can constitute, one or more of the various modules disclosed herein. Such modules are illustrated as monitoring modules 616. Accordingly, in some embodiments, the monitoring modules 616 can include the measurement control module 510, the collection module 520, the analysis module 540, and the provisioning module 550.

Execution of the monitoring modules 616, individually or in combination, by at least one of the processor(s) 604, can cause the computing device 602 to provide at least some of the functionality disclosed herein for power monitoring of a power grid using cable network devices. For instance, execution of the monitoring modules 616, individually or in combination, can cause the computing device 602 to perform one or many of the techniques disclosed herein.

The mass storage 608 also can retain data that can be utilized to implement the functionality disclosed herein for power monitoring of a power grid using cable network devices or that can result from the implementation of such functionality. Such data are illustrated as monitoring configuration data 618 and can include, for example, one or a combination of polling schedules or other types of defined times for the performance of power measurements; anomaly rules; threshold values; and the like.

Each computing device 602 also can include one or more input/output interface devices 612 (referred to as I/O interface 612) that can permit or otherwise facilitate external devices to communicate with the computing device 600. For instance, the I/O interface 610 may be used to receive and send data and/or instructions from and to an external computing device. In addition, each computing device 602 can includes one or many network interface devices 614 (referred to as network interface 614) that can permit or otherwise facilitate functionally coupling the computing device 602 with one or more external devices. Functionally coupling the computing device 602 to an external device can include establishing a wireline connection or a wireless connection between the computing device 602 and the external device. As an illustration, in some embodiments, the computing device 600 can send data, metadata, and/or signaling wirelessly to one or more other computing devices 602 by means of the network interface 612.

In addition, or in another embodiment, the computing device 602 can send data to the data storage 428 by means of the network interface 614 and a communication architecture 620. Further, or in yet other embodiments, the computing device 602 can send data to the repository 540 by means of the network interface 614 and a communication architecture 630. Although not shown in FIG. 6, the repository 540 can include exception handling algorithm(s) 570. Each of the communication architecture 620 and the communication architecture 630 can include wireless link(s), wireline link(s), and/or other devices that permit the transmission and reception of data.

The network interface 614 also can functionally couple the computing device 602 to the communication architecture 495, to send data to at least one of the power supplier management devices 490.

Each one of the cable network devices can include at least one processor, at least one memory device, and one or more communication resources. The at least one processor can execute machine-accessible instructions encoded or otherwise embedded in the at least one memory device. In response to execution of such instructions, the cable network device can be configured to perform power measurements and communicate observed values corresponding to the performed measurements, as is described herein.

Figure 7:
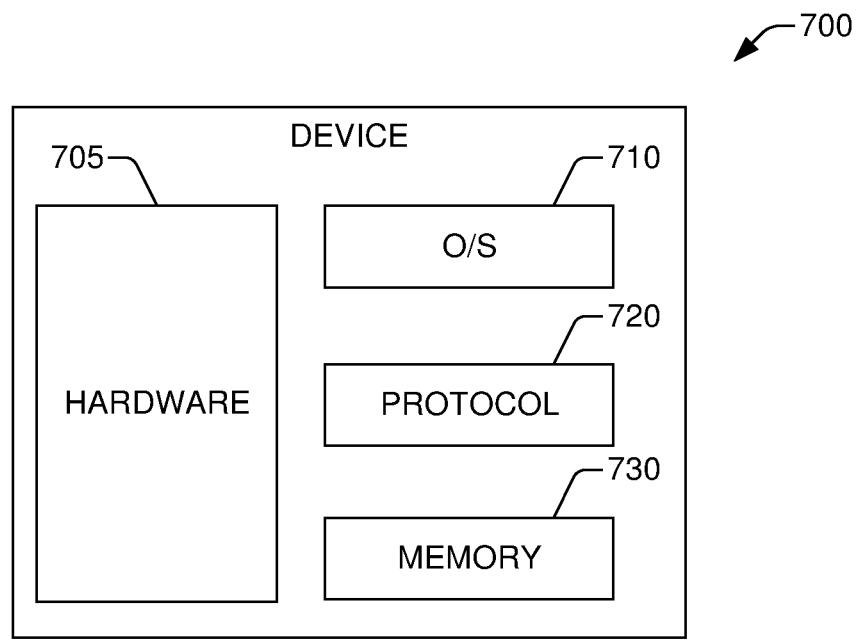
FIG. 7 presents an example of a cable network device, in accordance with one or more embodiments of this disclosure.

More specifically, FIG. 7 is a schematic block diagram of an example of a device 700 in accordance with one or more embodiments of this disclosure. The device 700 can embody, or can constitute, a cable network device in accordance with aspects described herein. For example, the device 700 can embody, or can constitute, a network node device, a power inserter device, an outside plant amplifier, or CPE. As such, the device 700 includes hardware 705 that can provide functionality that is specific to device 700. The hardware 705 can include circuitry and/or other types of components to provide the functionality.

The device 700 also includes an operating system 710. In an aspect, the operating system 710 may include any suitable operating system, such as a Linux or a Unix operating system. The device 700 also can include one or many protocols 720 (referred to as protocol 720). The protocol 720 can include any suitable standard. For example, the protocol 720 can conform with DOCSIS and, thus, can include at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. The protocol 720 also can permit the cable modem to communicate wirelessly with an external device.

In addition, the device 700 also includes one or more memory devices 730 (generically referred to as memory 730. In particular, the memory 730 can retain data from measurements and/or results representative of performance metrics in accordance with this disclosure. In addition, or in some configurations, the memory 730 can retain program code and data (none of those depicted in FIG. 7) to perform power measurements and report respective observed values to other devices in a cable network, in accordance with aspects described herein. Those other devices include the monitoring system 426 (FIG. 4), in some configurations.

The device 700 can include processor(s) (not depicted in FIG. 7) to control the performance of power measurements or communicate with or other devices on a cable network, or both, for example. The processor(s) also can perform signal modulation and similar functions. As mentioned, the processor(s) may be embodied in one or several complex programmable logic devices (CPLDs), microprocessors, multi-core processors, coprocessing entities, application-specific instruction-set processors (ASIPs), microcontrollers, and/or controllers. Further, the processor(s) may be embodied as one or more other processing devices or circuitry. In addition, or in some embodiments, the processor(s) can be embodied in integrated circuits, application specific integrated circuits (ASICs), field programmable gate arrays (FPGAs), programmable logic arrays (PLAs), hardware accelerators, other circuitry, and/or the like.

Figure 8:
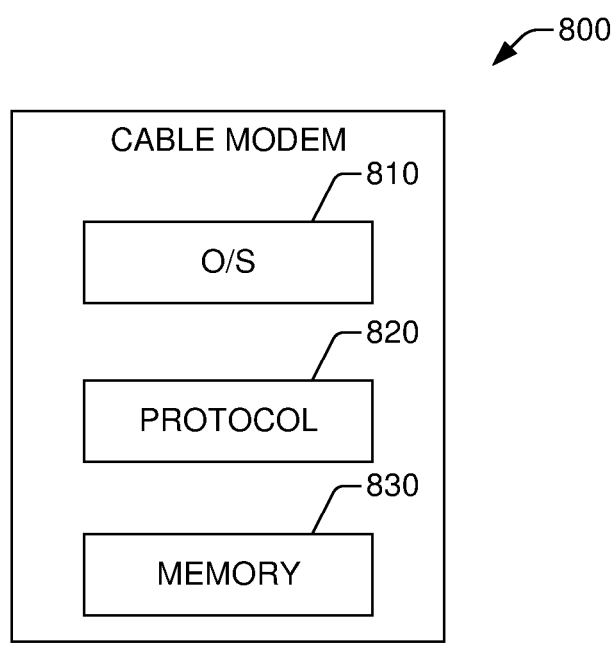
FIG. 8 presents an example of a cable modem, in accordance with one or more embodiments of this disclosure.

FIG. 8 is a schematic block diagram of an example of a cable modem 800, in accordance with one or more embodiments of this disclosure. The cable modem 800 includes an operating system 810. In an aspect, the operating system 810 may include any suitable operating system, such as a Linux or a Unix operating system. The cable modem 800 also can include one or many protocols 820 (referred to as protocol 820). The protocol 820 can include any suitable standard. For example, the protocol 820 can conform with DOCSIS and, thus, can include at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. The protocol 820 also can permit the cable modem to communicate wirelessly with an external device.

In addition, the cable modem 800 also includes one or more memory devices 830 (generically referred to as memory 830. In particular, the memory 830 can retain data from measurements and/or results representative of performance metrics in accordance with this disclosure. In addition, or in some configurations, the memory 830 can retain program code and data (none of those depicted in FIG. 7) to perform power measurements and report respective observed values to other devices in a cable network, in accordance with aspects described herein. Those other devices include the monitoring system 426 (FIG. 4), in some configurations.

In some embodiments, the cable modem 800 can include processor(s) (not depicted in FIG. 8) to control the performance of power measurements or communicate with other devices on a cable network, or both. The processor(s) also can perform signal modulation and similar functions. As mentioned, the processor(s) may be embodied in one or several complex programmable logic devices (CPLDs), microprocessors, multi-core processors, coprocessing entities, application-specific instruction-set processors (ASIPs), microcontrollers, and/or controllers. Further, the processor(s) may be embodied as one or more other processing devices or circuitry. In addition, or in some embodiments, the processor(s) can be embodied in integrated circuits, application specific integrated circuits (ASICs), field programmable gate arrays (FPGAs), programmable logic arrays (PLAs), hardware accelerators, other circuitry, and/or the like.

Figure 9:
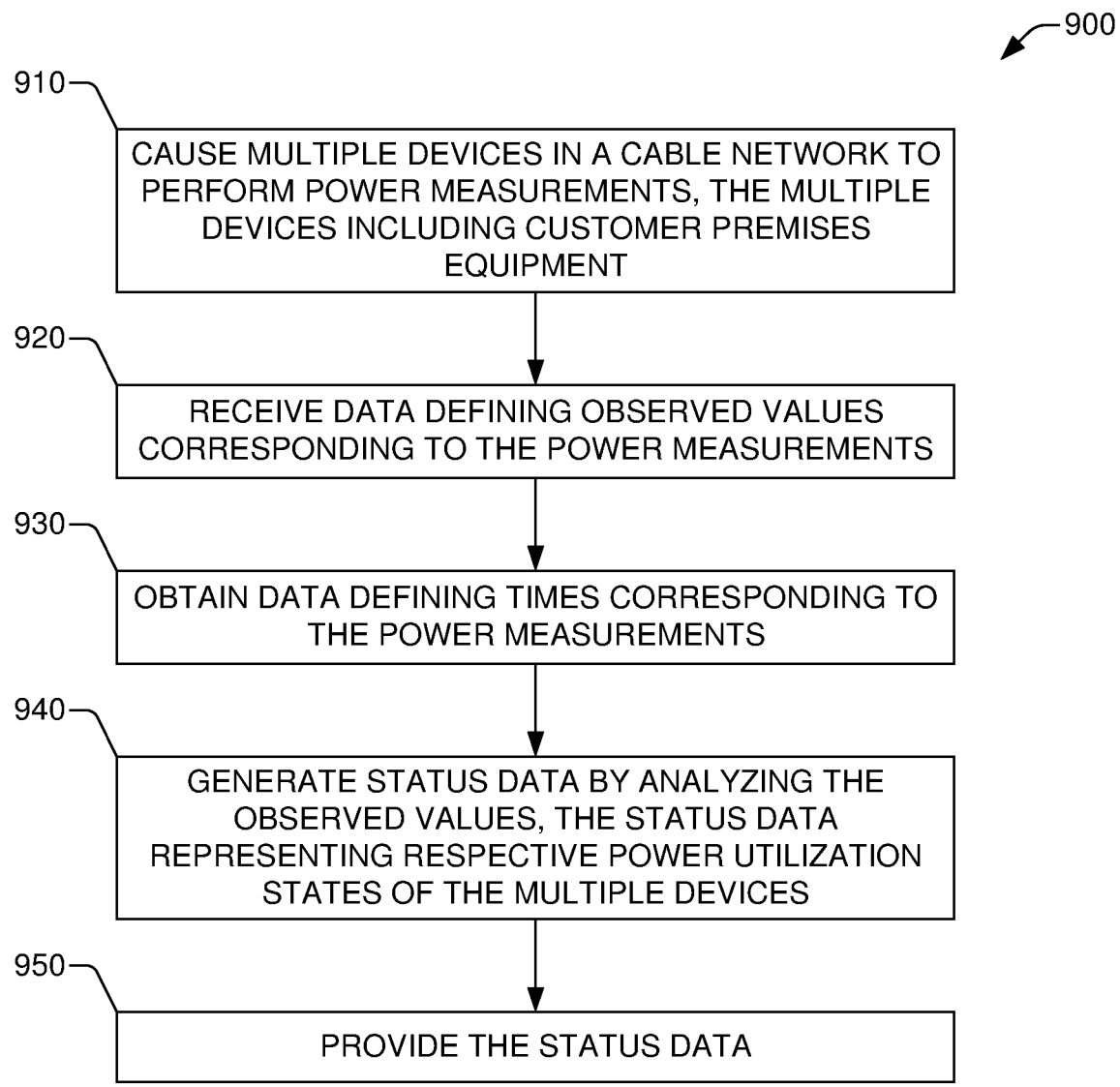
FIG. 9 presents an example of a method for monitoring a power grid using network devices in a cable network, in accordance with one or more embodiments of this disclosure.
Figure 10:
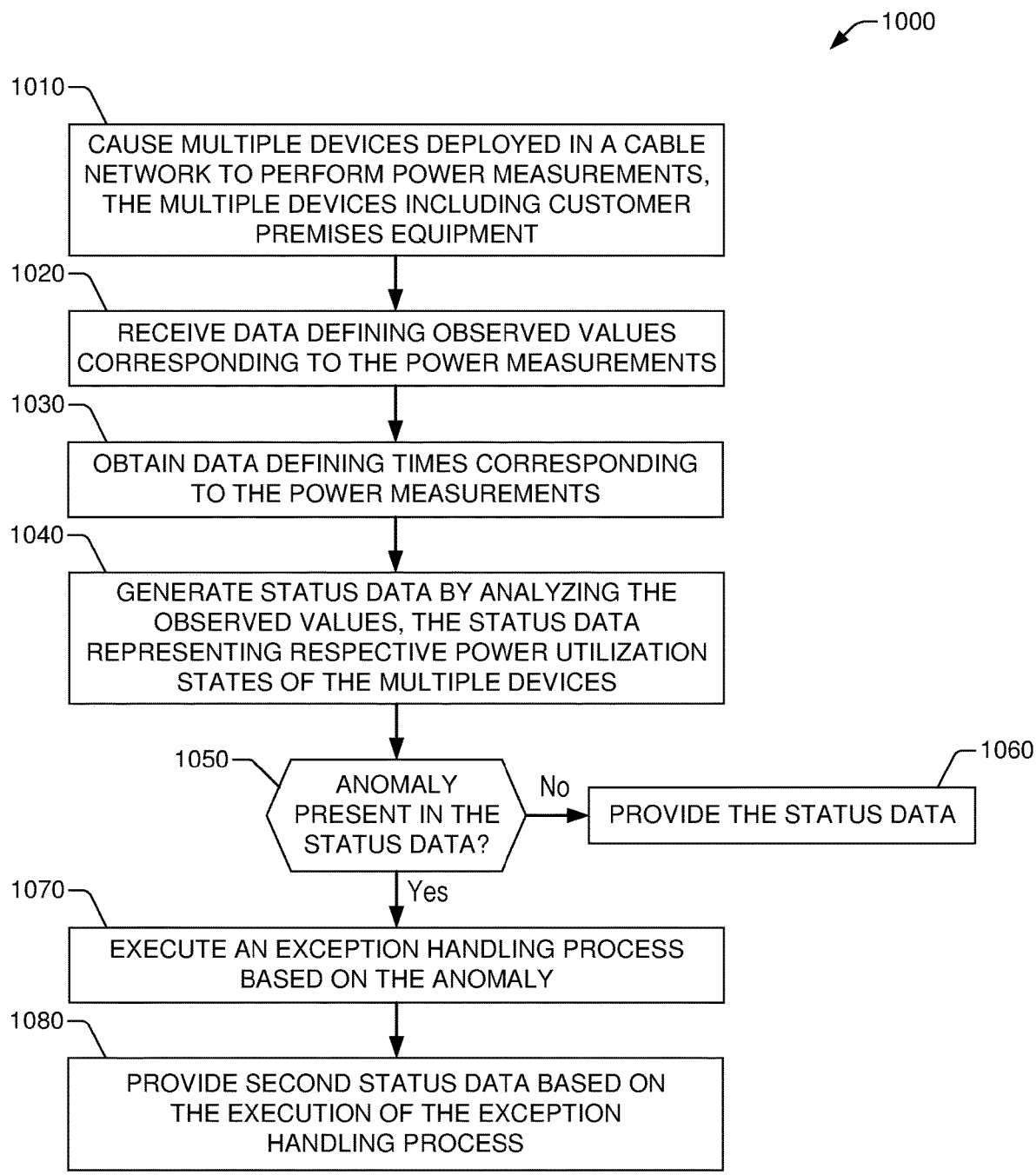
FIG. 10 presents an example of a method for monitoring a power grid using network devices in a cable network, in accordance with one or more embodiments of this disclosure.

Other examples of the techniques that can be implemented in accordance with this disclosure can be better appreciated with reference to the flowcharts in FIG. 9 and FIG. 10. For purposes of simplicity of explanation, the techniques illustrated in FIG. 9 and FIG. 10 (and other techniques disclosed herein) are presented and described as a series of operations. It is noted, however, that the exemplified methods and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, each block of the flowchart illustrations and/or combinations of blocks in the flowchart illustrations can be implemented by the programming code instructions, in response to execution by one or many processors for example.

FIG. 9 is a flowchart of an example of a method 900 for monitoring a power grid using network devices in a cable network, in accordance with one or more embodiments of this disclosure. The example method 900 can be performed, entirely or partially, by a computing system. The computing system includes or is functionally coupled to one or many processors, one or many memory devices, other types of computing resources, a combination thereof, or the like. Such processor(s), memory device(s), and computing resources, individually or in a particular combination, permit or otherwise facilitate implementing the example method 900. The computing resources can include operating systems (O/Ss); software for configuration and/or control of a virtualized environment; firmware; central processing unit(s) (CPU(s)); graphics processing unit(s) (GPU(s)); tensor processing unit(s) (TPU(s)); virtual memory; disk space; interface(s) (I/O interface devices, programming interface(s) (such as application programming interfaces (APIs), etc.); controller devices(s); power supplies; a combination of the foregoing; or the like.

At block 910, the computing system can cause multiple devices deployed in a cable network to perform power measurements. The power measurements can include, for example, measurements of input voltage, measurements of output voltage, measurements of input current, measurements of output current, measurements of input power, measurements of output power, and similar. Each of a voltage and a current being measured can be either DC or AC. Measurements of a DC voltage and an AC voltage can include, respectively, a measurement of an amplitude of the DC voltage and a measurement of an amplitude of the AC voltage. A measurement of the AC voltage also can include a measurement of a phase angle of the AC voltage. Similar measurements can be performed for a current. Specifically, measurements of a DC current and an AC current can include, respectively, a measurement of an amplitude of the AC current and a measurement of an amplitude of the AC current. In addition, a measurement of the AC current also can include a measurement of a phase angle of the AC current.

The multiple network devices can be distributed across different spatial scales. A first subgroup of the multiple devices can be distributed according to a first spatial scale. A second subgroup of the multiple devices can be distributed according to a second spatial scale less than the first spatial scale. For instance, the first spatial scale can be of the order of kilometers and the second spatial scale can be of the order of meters. Accordingly, the power measurements can determine information identifying statuses of a power grid at different spatial resolutions. In some embodiments, the multiple network devices can include RPDs, RMDs, power inserter devices, outside plant amplifiers, and CPE.

The computing system can cause the multiple devices to perform power measurements in numerous ways. In some configurations, the computing system can direct the multiple devices to perform the power measurements at defined times (e.g., periodically or according to a defined schedule) or in response to a defined event, or both. Directing the multiple devices to perform power measurements can include sending respective instruction messages directing the multiple devices to perform defined power measurements at defined times. Thus, the computing system can send a first instruction message directing a first device of the multiple devices to perform first power measurements, and also can send a second instruction message directing a second device of the multiple devices to perform second power measurements. Each one of the respective instruction messages can be formatted according to a communication specification compliant with DOCSIS®. Each one of the respective instruction messages can include first payload data defining the times at which power measurement are to be performed; second payload data indicating that power measurements are to be performed in real-time; or second payload data defining an event that can cause a power measurement to be performed; or both such types of payload data.

In addition, or in other configurations, the computing system can poll the multiple devices for power data at defined times. Polling a network device for power data can include, for example, sending a request for the power data to the network device. The network device can then respond to the request by performing a power measurement upon receiving the request, or by queueing the request and performing the power measurement at a suitable time after receiving the request.

At 920, the computing system can receive data defining observed values corresponding to the power measurements. In some configurations, each observed value corresponds to a respective power measurement of the power measurements. The data can be received using PNM messaging in accordance with DOCSIS®. As such, data defining an observed value corresponding to a power measurement can be received as payload data carried in a message formatted according to PNM. The amount of payload data carried in the message can be of the order of one byte. Simply as an illustration, such an amount can be one byte, two bytes, three bytes, or four bytes.

At 930, the computing system can obtain data defining times corresponding to the power measurements. In some configurations, each defined time represents an instant when a respective power measurement occurred. In some embodiments, obtaining the data includes receiving the data from a network device that performs the power measurement. Such data can be received using PNM messaging in accordance with DOCSIS®. Thus, data defining a time corresponding to a power measurement can be received as payload data carried in a message formatted according to PNM. Again, the amount of payload data carried in such a message can be of the order of one byte. Simply as an illustration, such an amount can be one byte, two bytes, three bytes, or four bytes. In other embodiments, obtaining the data includes determining times at which data defining respective power measurements have been received by the computing system. Those determined times can essentially correspond to the actual times at which network devices performed respective power measurements. As mentioned, differences between the determined times and the actual times can originate from network latency associated with receiving data defining observed values corresponding to power measurements.

In some instances, first data defining an observed value corresponding to a power measurement and second data defining a time corresponding to the power measurement can be received in a single message formatted according to PNM. In those instances, both the first data and the second data are carried as payload in the message.

At block 940, the computing system can generate status data by analyzing the observed values. The status data represent respective power utilization states of the multiple devices. The observed values can be analyzed in numerous ways. In one configuration, analyzing the observed values can include generating statistics of the observed values. In addition, or in another configuration, analyzing the observed values also can include generating functions of a time series formed by the observed values. Such functions can include a discrete n-th order derivative of the time series, e.g., a first derivative of the time series, a second derivative of the time series, and so forth. By generating one or several of those functions, the computing system can determine a trend of the time series.

At block 950, the computing system can provide the status data. The status data can be provided to one or many network devices of a power supplier. For instance, the network device(s) can be embodied in at least one of the power supplier management devices 490 (FIG. 4). The status data can be provided in numerous ways. For example, the computing system can provide the status data by updating records retained in data storage, and then permitting access to the updated records. The records within the data storage can constitute a database, in some configurations. The database can be a relational database or another type of database containing unstructured data. Updating the records can include adding metadata to the status data to generate location-based status data. The metadata can define a location corresponding to a subset of the power measurements, for example. The updating also can include using the location-based status data to generate updated records, each one of the updated records including a defined observed value corresponding to a defined power measurement of the subset of power measurements; the metadata; and a timestamp defining a time of performance of the defined power measurement.

To provide access to the updated records, in some embodiments, the computing system can configure and expose an application programming interface (API). The API can be exposed as a public API or a private API. Particular network device(s) of the power supplier can access the status data by means of the private API. In other words, the particular network device(s) can perform one or many types of function calls defined by the API. In addition, or in other embodiments, the computing system can generate a file that includes at least a subset of the updated records. The computing system can then send the file to a network device of the power supplier management network and/or another computing device remotely located relative to the computing system.

FIG. 10 is a flowchart of an example of a method 1000 for monitoring a power grid using network devices in a cable network, in accordance with one or more embodiments of this disclosure. The example method 1000 can be performed, entirely or partially, by a computing system. The computing system can be the same as, or similar to, the computing system that implements the example method 900 (FIG. 9).

At block 1010, the computing system can cause multiple network devices deployed in a cable network to perform power measurements. As mentioned, the power measurements can include, for example, measurements of input voltage, measurements of output voltage, measurements of input current, measurements of output current, measurements of input power, measurements of output power, and similar. Each of a voltage and a current being measured can be either DC or AC. Measurements of a DC voltage and an AC voltage can include, respectively, a measurement of an amplitude of the DC voltage and a measurement of an amplitude of the AC voltage. A measurement of the AC voltage also can include a measurement of a phase angle of the AC voltage. Similar measurements can be performed for a current. Specifically, measurements of a DC current and an AC current can include, respectively, a measurement of an amplitude of the AC current and a measurement of an amplitude of the AC current. In addition, a measurement of the AC current also can include a measurement of a phase angle of the AC current.

As also mentioned, the multiple network devices can be distributed across different spatial scales. A first subgroup of the multiple devices can be distributed according to a first spatial scale. A second subgroup of the multiple devices can be distributed according to a second spatial scale less than the first spatial scale. For instance, the first spatial scale can be of the order of kilometers and the second spatial scale can be of the order of meters. Accordingly, the power measurements can determine information identifying statuses of a power grid at different spatial resolutions. In some embodiments, the multiple network devices can include RPDs, power inserter devices, outside plant amplifiers, and CPE.

The computing system can cause the multiple devices to perform power measurements in numerous ways. In some configurations, the computing system can direct the multiple devices to perform the power measurements at defined times (e.g., periodically or according to a defined schedule) or in response to a defined event, or both. Directing the multiple devices to perform power measurements can include sending respective instruction messages directing the multiple devices to perform defined power measurements at defined times. Thus, the computing system can send a first instruction message directing a first device of the multiple devices to perform first power measurements, and also can send a second instruction message directing a second device of the multiple devices to perform second power measurements. Each one of the respective instruction messages can be formatted according to a communication specification compliant with DOCSIS®. Each one of the respective instruction messages can include first payload data defining the times at which power measurement are to be performed; or second payload data defining an event that can cause a power measurement to be performed; or both such types of payload data.

In addition, or in other configurations, the computing system can poll the multiple devices for power data at defined times. Polling a network device for power data can include, for example, sending a request for the power data to the network device. The network device can then respond to the request by performing a power measurement upon receiving the request, or by queueing the request and performing the power measurement at a suitable time after receiving the request.

At 1020, the computing system can receive data defining observed values corresponding to the power measurements. In some configurations, each observed value corresponds to a respective power measurement of the power measurements. The data can be received using PNM messaging in accordance with DOCSIS®. Thus, data defining an observed value corresponding to a power measurement can be received as payload data carried in a message formatted according to PNM. Again, the amount of payload data carried in such a message can be of the order of one byte. Simply as an illustration, such an amount can be one byte, two bytes, three bytes, or four bytes.

At 1030, the computing system can obtain data defining times corresponding to the power measurements. In some configurations, each defined time represents an instant when a respective power measurement occurred. In some embodiments, obtaining the data includes receiving the data from a network device that performs the power measurement. Such data can be received using PNM messaging in accordance with DOCSIS®. Thus, data defining a time corresponding to a power measurement can be received as payload data carried in a message formatted according to PNM. Again, the amount of payload data carried in such a message can be of the order of one byte. Simply as an illustration, such an amount can be one byte, two bytes, three bytes, or four bytes. In other embodiments, obtaining the data includes determining times at which data defining respective power measurements have been received by the computing system. Those determined times can essentially correspond to the actual times at which network devices performed respective power measurements. As mentioned, differences between the determined times and the actual times can originate from network latency associated with receiving data defining observed values corresponding to power measurements.

In some instances, the first data defining an observed value corresponding to a power measurement and second data defining a time corresponding to the power measurement can be received in a single message formatted according to PNM. In those instances, both the first data and the second data are carried as payload in the message.

At block 1040, the computing system can generate status data by analyzing the observed values. The status data represent respective power utilization states of the multiple devices. As is discussed above, the observed values can be analyzed in numerous ways. In one configuration, analyzing the observed values can include generating statistics of the observed values. In addition, or in another configuration, analyzing the observed values also can include generating functions of a time series formed by the observed values.

Such functions can include a discrete n-th order derivative of the time series, e.g., a first derivative of the time series, a second derivative of the time series, and so forth. By generating one or several of those functions, the computing system can determine a trend of the time series.

At block 1050, the computing system can determine if an anomaly is present in the status data. To that end, in some instances, the computing system can determine if one or many observed values corresponding to a particular type of power measurement individually exceed a threshold value. The particular type of power measurement can be, for example, voltage measurement or current measurement. The threshold value also can be specific to a type of device (e.g., CPE, outside plant amplifier, power inserter device, RPD, or similar).

In addition, or in other instances, the computing system can determine if temporal changes in a time series of at least some of the observed values satisfies an anomaly rule. Accordingly, in one configuration, the computing system can determine a standard deviation of the time series. The monitoring system 426 also can determine one or more other types of moments (mean value, skewness, etc.) of the observed values in the time series. The computing system can then determine that the anomaly rule is satisfied in response to the standard deviation being equal to or greater than a defined threshold value. Stated in different terms, the computing system can detect an anomaly in the time series of observed values when the temporal spread of the values meets or exceeds a particular threshold magnitude. Further, or in another configuration, the computing system can determine a discrete first-order derivative of the time series of observed values. The computing system can then determine that the anomaly rule is satisfied when values of the first-order derivative increase monotonically, and at least one of the values exceed a defined threshold magnitude. Stated in different terms, the computing system can detect an anomaly in the time series of observed values when the temporal changes exhibit.

In response to determining that the anomaly is not present in the status data, the computing system can provide the status data at block 1060. The status data can be provided to one or many network devices of a power supplier. For instance, the network device(s) can be embodied in at least one of the power supplier management devices 490 (FIG. 4). The status data can be provided in numerous ways. For example, the computing system can provide the status data by updating records retained in data storage, and then permitting access to the updated records. The records within the data storage can constitute a database, in some configurations. The database can be a relational database or another type of database containing unstructured data.

Updating the records can include adding metadata to the status data to generate location-based status data. The metadata can define a location corresponding to a subset of the power measurements, for example. The updating also can include using the location-based status data to generate updated records, each one of the updated records including a defined observed value corresponding to a defined power measurement of the subset of power measurements; the metadata; and a timestamp defining a time of performance of the defined power measurement.

To provide access to the updated records, in some embodiments, the computing system can configure and expose an application programming interface (API). The API can be exposed as a public API or a private API. Particular network device(s) of the power supplier can access the status data by means of the private API. In other words, the particular network device(s) can perform one or many types of function calls defined by the API. In addition, or in other embodiments, the computing system can generate a file that includes at least a subset of the updated records. The computing system can then send the file to a network device of the power supplier platform.

In the alternative, in response to determining at block 1050 that the anomaly is present in the status data, the flow of the example method 1000 can continue to block 1070. At that block, the computing system can execute an exception handling process based on the anomaly. In some embodiments, executing the exception handling process can include identifying a particular device of the multiple devices, where the particular device has originated at least one observed value associated with the status data. Executing the exception handling process also can include determining a location of the particular device. The location can be determined by mapping a unique identifier of the particular device to a record defining the location. Executing the exception handling process can further include generating a message including at least one of the location or data indicating the type of anomaly that has been detected at block 1050. In some configurations, executing the exception handling process also can include sending the message to at least one of the power supplier management devices 490. The message can be sent wirelessly or using a wireline connection, or both, by means of a communication architecture 495.

In addition, or in other embodiments, executing the exception handling process can include monitoring a group of the multiple devices during a defined time interval, where each device in the group has originated observed values associated with the status data containing the anomaly detected at block 1050. Executing the exception handling process also can include identifying a subset of devices in the group, where each device in the subset has sent a shutdown notification during the defined time interval. Executing the exception handling process can further include determining respective locations of devices included in the subset. Again, the respective locations can be determined by mapping unique identifiers of those devices to respective records defining the respective locations. The exception handling process also can include generating a message including the respective locations and data indicating an offline state. Executing the exception handling process also can include, in some configurations, sending the message to at least one of the power supplier management devices 490. The message can be sent wirelessly or using a wireline connection, or both, by means of a communication architecture 495.

In some embodiments, in addition to determining locations, executing the exception handling process can include determining times at which shutdown notifications have been received by the computing system. Those times can essentially correspond to the times at which the cable network devices transition to an offline state. As a result of executing the exception handling process, the time dependence and position dependence of power shutdown can be tracked in a particular region. Thus, a power shutdown front can be tracked in time and space in essentially real-time, as cable network devices transition to an offline state.

At block 1080, the computing system can provide second status data based on the execution of the exception handling process.

Although examples of processing systems have been described above, implementations of the technologies and related functional operations of this disclosure can be implemented in other types of digital electronic circuitry, or in computer software, firmware, or hardware, including the structures disclosed in this specification and their structural equivalents, or in combinations of one or more of them.

Embodiments of the technologies and related functional operations of this disclosure can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources For purposes of illustration, a data processing apparatus encompasses all kinds of apparatus, devices, and machines for processing data, including by way of example a programmable processor, a computer, a system on a chip, or multiple ones, or combinations, of the foregoing. The data processing apparatus can include special purpose logic circuitry, for example an FPGA (field programmable gate array) or an ASIC (application-specific integrated circuit). The data processing apparatus also can include, in addition to hardware, program code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or program code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output information/data. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or send information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or integrated in, special purpose logic circuitry.

To provide for interaction with a user, embodiments of the subject matter described herein can be implemented on a computer having a display device, for example a CRT (cathode ray tube), LCD (liquid crystal display), or LED (light emitting diode) based monitor, for displaying information/data to the user and a keyboard and a pointing device, for example a mouse or a trackball, by which the user can provide input to the computer. Other kinds of devices can be used to provide for interaction with a user as well. For example, feedback provided to the user can be any form of sensory feedback, for example visual feedback, aural feedback, or haptic feedback; and input from the user can be received in any form, including acoustic, speech, or tactile input. In addition, a computer can interact with a user by sending documents to and receiving documents from a device that is used by the user. For example, by sending web pages to a web browser on a user's client device in response to requests received from the web browser.

Embodiments of the technologies disclosed herein can be implemented in a computing system that includes a backend component, for example as an information/data server, or that includes a middleware component, for example an application server, or that includes a frontend component, for example a client computer having a graphical user interface or a web browser through which a user can interact with an implementation of one or several of the technologies disclosed herein, or any combination of one or more such backend, middleware, or frontend components. The components of the computing system can be interconnected by any form or medium of digital information/data communication, for example a communication network. Examples of communication networks include a local area network (LAN) and a wide area network (WAN), an inter-network (for example the Internet), and peer-to-peer networks (for example ad hoc peer-to-peer networks).

The computing system can include client devices and server devices. A client device and a server device are generally remotely located relative to one another and typically interact through a communication network. The relationship of client and server arises by virtue of computer programs running on the respective computers and having a client-server relationship to each other. In some embodiments, a server device transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be ~xcised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the technologies of this disclosure have been described. Other embodiments are within the scope of the following claims. In some cases, the actions recited in the claims can be performed in a different order and still achieve desirable results. In addition, the processes depicted in the accompanying FIGS. do not necessarily require the particular order shown, or sequential order, to achieve desirable results: In certain implementations, multitasking and parallel processing may be advantageous.

Many modifications and other embodiments of the technologies set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   causing, by a computing system comprising at least one processor, multiple devices in a cable network to perform power measurements, the multiple devices comprising customer premises equipment;
   receiving, by the computing system, first data defining observed values, a first observed value of the observed values resulting from a first power measurement of the power measurements;
   obtaining, by the computing system, second data defining times corresponding to the power measurements, wherein the first power measurement occurs at a first time of the defined times;
   generating, by the computing system, status data by analyzing the observed values, the status data representing respective power utilization states of the multiple devices; and
   providing, by the computing system, the status data to a computing device remotely located relative to the computing system, the computing device being associated with operation of a power grid.

2. The method of claim 1, wherein the causing comprises sending a message directing a first device of the multiple devices to perform defined power measurements at defined times, the message formatted according to a communication specification compliant with data over cable service interface specifications (DOCSIS).

3. The method of claim 1, wherein the receiving the power data comprises using proactive network maintenance messaging (PNM) in accordance with data over cable service interface specifications (DOCSIS).

4. The method of claim 1, further comprising,
   generating, by the computing system, second status data by analyzing the observed values, the second status data representing respective second power utilization states of the multiple devices;
   determining that the second status data satisfies an anomaly rule;
   executing an exception handling process based on the satisfied anomaly rule; and
   providing third status data based on the execution of the exception handling process.

5. The method of claim 4, wherein the determining comprises determining that one or more observed values corresponding to a defined type of power measurement individually exceed a threshold value, the defined type of power measurement being one of voltage measurement or current measurement and the threshold value being specific to a type of device.

6. The method of claim 4, wherein the determining comprises determining that a standard deviation of a subset of the observed values being equal to or greater than a defined threshold value.

7. The method of claim 4, wherein the executing comprises,
   identifying a particular device of the multiple devices, the particular device originated at least one second observed value associated with the second status data;
   determining a location of the particular device by mapping a unique identifier of the particular device to a record defining the location;
   generating a message comprising at least one of the location or the satisfied anomaly rule; and
   sending the message to the computing device.

8. The method of claim 4, wherein the executing comprises, monitoring a group of the multiple devices during a defined time interval, each device in the group originated second observed values associated with the second status data;
identifying a subset of the group of the multiple devices that sent shutdown notifications during the defined time interval;
determining respective locations of the subset of the group of the multiple devices;
generating a message comprising the respective locations and data indicating an offline state; and
sending the message to the computing device.

9. The method of claim 1, wherein the providing comprises,
adding metadata to the status data to generate location-based status data, the metadata defining a location corresponding to a subset of the power measurements;
updating using the location-based status data, records retained in data storage, each one of the records comprises a defined observed value corresponding to a defined power measurement of the subset of the power measurements, the metadata, and a timestamp defining a time of performance of the defined power measurement;
generating a file comprising at least a subset of the updated records; and
sending the file to the computing device.

10. The method of claim 1, wherein the providing comprises,
adding metadata to the status data to generate location-based status data, the metadata defining a location corresponding to at least a subset of the power measurements;
updating, using the location-based status data, a database retained in data storage;
configuring an application programming interface (API) to access the updated database; and
permitting the computing device to query the updated database using a function call to the API.

11. A computing system, comprising:
at least one processor; and
at least one memory device having computer-executable instructions encoded thereon that, in response to execution by the at least one processor, cause the computing system to,
cause multiple cable network devices to perform power measurements, the multiple cable network devices comprising customer premises equipment;
receive first data defining observed values corresponding to the power measurements, a first observed value of the observed values resulting from a first power measurement of the power measurements;
obtain second data defining times corresponding to the power measurements, wherein the first power measurement occurs at a first time of the defined times;
generate status data by analyzing the observed values, the status data representing respective power utilization states of the multiple cable network devices; and
provide the status data to a computing device associated with operation of a power grid.

12. The computing system of claim 11, wherein the causing comprises sending a message directing a first cable network device of the multiple cable network devices to perform defined power measurements at defined times, the message formatted according to a communication specification compliant with data over cable service interface specifications (DOCSIS).

13. The computing system of claim 11, wherein receiving the power data comprises using proactive network maintenance (PNM) messaging in accordance with data over cable service interface specifications (DOCSIS).

14. The computing system of claim 11, wherein further execution of the computer-executable instructions further causes the computing system to,
generate second status data by analyzing the observed values, the second status data representing respective second power utilization states of the multiple cable network devices;
determine that the second status data satisfies an anomaly rule;
execute an exception handling process based on the satisfied anomaly rule; and
provide third status data based on the execution of the exception handling process.

15. The computing system of claim 14, wherein determining that the second status data satisfies the anomaly rules comprises determining that one or more observed values corresponding to a defined type of power measurement individually exceed a threshold value, the defined type of power measurement being one of voltage measurement or current measurement and the threshold value being specific to a type of device.

16. The computing system of claim 14, wherein determining that the second status data satisfies the anomaly rules comprises determining that a standard deviation of a subset of the observed values being equal to or greater than a defined threshold value.

17. The computing system of claim 11, wherein providing the status data comprises,
adding metadata to the status data to generate location-based status data, the metadata defining a location corresponding to a subset of the power measurements;
updating using the location-based status data, records retained in data storage, each one of the records comprises a defined observed value corresponding to a defined power measurement of the subset of the power measurements, the metadata, and a timestamp defining a time of performance of the defined power measurement;
generating a file comprising at least a subset of the updated records; and
sending the file to the computing device.

18. The computing system of claim 11, wherein the computing device is deployed in a network operations center for the power grid, and wherein the customer premises equipment comprises at least one of a cable modem, a wireless service router, a wireless service gateway, or a set-top box, and wherein the multiple cable network devices further comprise a remote PHY device, a remote MAC device, a power inserter device, and an outside plant amplifier.

19. At least one computer-readable non-transitory storage medium having instructions encoded thereon that, in response to execution, cause a computing system to perform instructions comprising:
causing multiple cable network devices to perform power measurements, the multiple cable network devices comprising customer premises equipment;
receiving power data defining observed values corresponding to the power measurements, a first observed value of the observed values resulting from a first power measurement of the power measurements;

obtaining second data defining times corresponding to the power measurements, wherein the first power measurement occurs at a first time of the defined times;

generating status data by analyzing the observed values, the status data representing respective power utilization states of the multiple cable network devices; and providing the status data to a computing device remotely located relative to the computing system, the computing device being associated with operation of a power grid.

20. The at least one computer-readable non-transitory storage medium of claim 19, wherein the causing comprises sending a message directing a first cable network device of the multiple cable network devices to perform defined power measurements at defined times, the message formatted according to a communication specification compliant with data over cable service interface specifications (DOCSIS).

21. The at least one computer-readable non-transitory storage medium of claim 19, wherein the receiving the power data comprises using proactive network maintenance (PNM) messaging in accordance with data over cable service interface specifications (DOCSIS).

22. The at least one computer-readable non-transitory storage medium of claim 19, wherein the providing comprises, adding metadata to the status data to generate location-based status data, the metadata defining a location corresponding to a subset of the power measurements;

updating using the location-based status data, records retained in data storage, each one of the records comprises a defined observed value corresponding to a defined power measurement of the subset of the power measurements, the metadata, and a timestamp defining a time of performance of the defined power measurement;

generating a file comprising at least a subset of the updated records; and sending the file to the computing device.

* * * * *